United States Patent [19]
Sanchez

[11] 3,976,212
[45] Aug. 24, 1976

[54] AUTO WHEELS PLACER

[76] Inventor: Ramon Sanchez, 6102 Glencoe St., Houston, Tex. 77017

[22] Filed: June 18, 1973

[21] Appl. No.: 370,823

[52] U.S. Cl. .............................. 214/332; 254/10 R
[51] Int. Cl.² ......................................... B65B 29/00
[58] Field of Search ........... 214/330, 331, 332, 333, 214/334, 450–454; 254/10 R, 133; 105/215 R

[56] References Cited
UNITED STATES PATENTS

| | | | |
|---|---|---|---|
| 2,345,458 | 3/1944 | Caron | 214/332 |
| 2,525,437 | 10/1950 | Winzler et al. | 214/332 |
| 2,543,276 | 2/1951 | Buechler | 214/332 |
| 2,570,587 | 10/1951 | Noone et al. | 214/332 |
| 3,378,154 | 4/1968 | Mousel | 214/332 |
| 3,672,525 | 6/1972 | Schaedler | 214/731 |

FOREIGN PATENTS OR APPLICATIONS

| 1,154,659 | 3/1955 | France | 214/330 |
|---|---|---|---|

Primary Examiner—Robert J. Spar
Assistant Examiner—Lawrence J. Oresky

[57] ABSTRACT

The present invention refers to a device to place automobile wheels in their respective axles, as well as truck wheels and other vehicles wheels, after the car has been raised with a regular jack.

1 Claim, 5 Drawing Figures

AUTO WHEELS PLACER

BACKGROUND OF THE INVENTION

1. Field of the Invention

This invention refers to a device to place automobile wheels, truck and other vehicles' wheels in their respective axles, facilitating lifting and moving of the wheels in any direction to make the holes in the wheels coincide with the screws in the brake drums.

2. Prior Art

There are devices of various types (jacks) to lift autos, trucks, etc., but there is not one specifically to lift and help place the wheels in their respective axles after the autos are lifted.

SUMMARY OF THE INVENTION

The object of this invention is to provide a device that makes possible the lifting and placing of autos' wheels, trucks and other vehicles' wheels in their axles with a minimum effort on the part of the operator. This device has the advantage of being small, light weighted and can easily be folded, requiring minimum space.

DESCRIPTION OF THE DRAWINGS

In the accompanying drawings,

FIG. I is an overall view of the device described.

Figure 1:
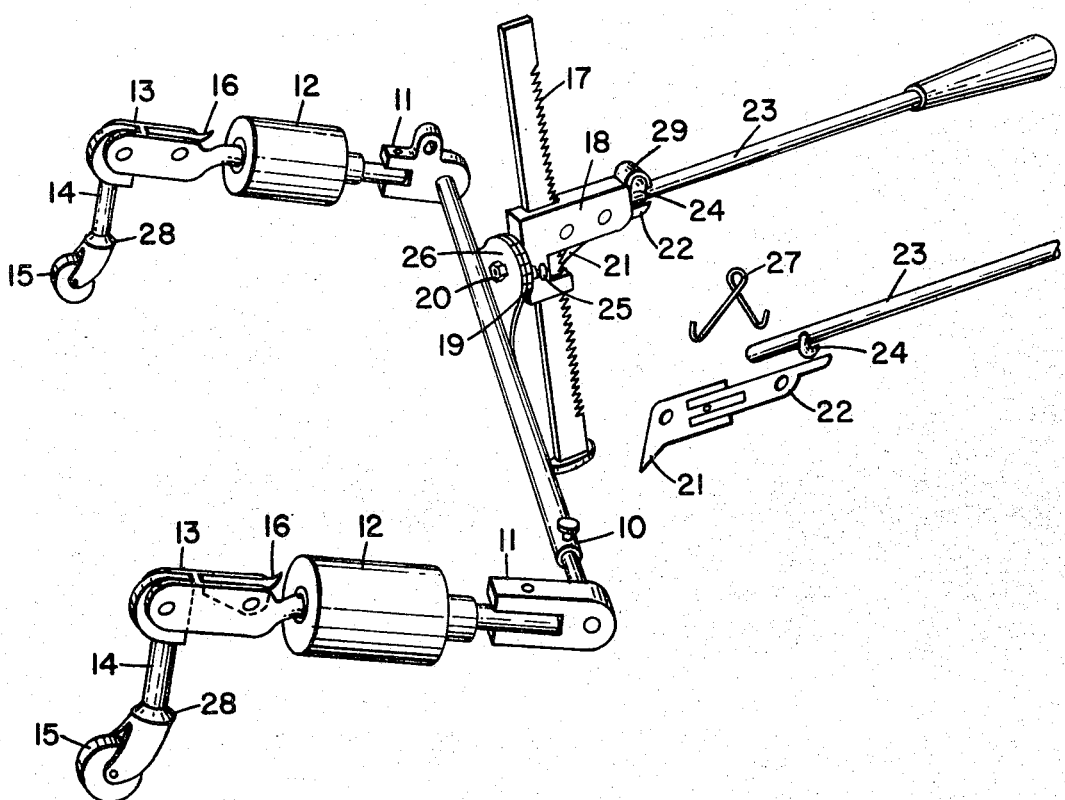
Figure 2:
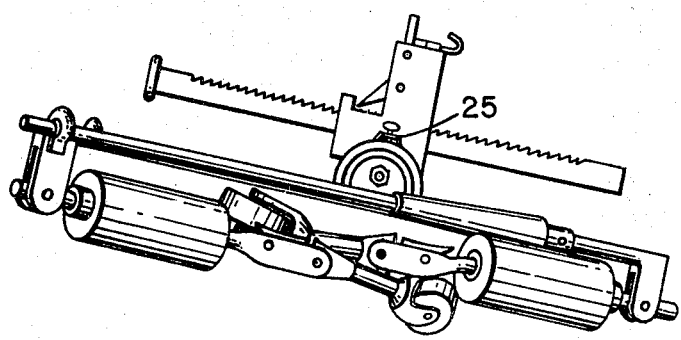
Figure 3:
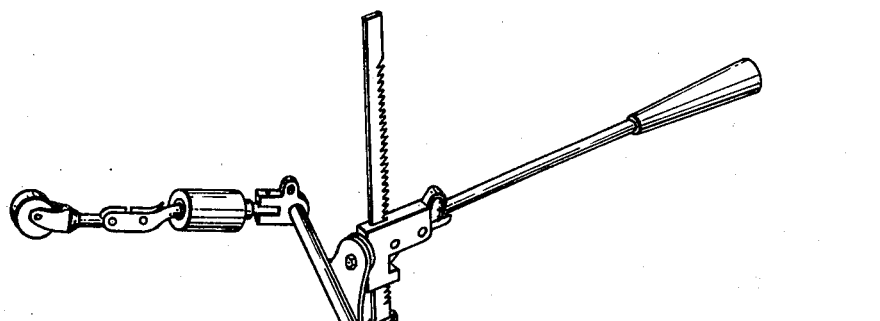
Figure 4:
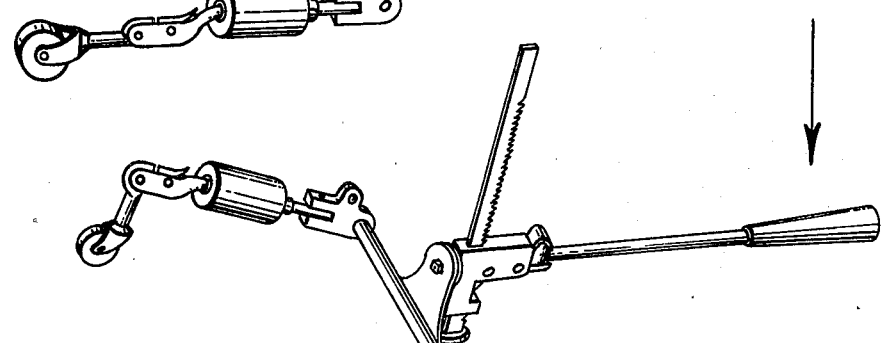
Figure 5:
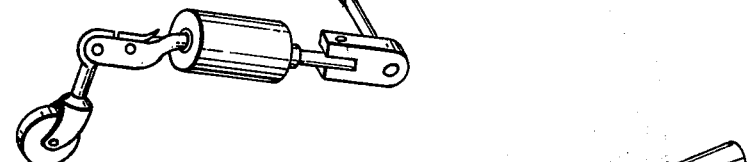
Figure 5:
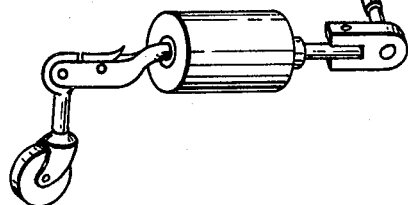

FIG. II is a view that shows the way in which the said device can be folded, which makes it take minimum space when it needs to be put away.

FIGS. III, IV and V show steps of functioning.

DESCRIPTION OF THE PREFERRED EMBODIMENTS

Referring to the accompanying drawings which form part of the disclosure, a device to place auto, truck and other vehicles' wheels comprising an extensible bar 10 which has two arms 30 that are connected one to each end of the said bar by means of articulations 11. The said arms 30 comprising two rollers 12, one on each arm 30, said rollers 12 being rotatably mountd on the said arms 30.

The said arms 30 comprising, besides the articulations 11 that connect them to the extensible bar 10, two other articulations 13 provided with a pawl 16. Said articulations provided with a pawl 16 connect the said arms 30 to two prolongations 14 that increase the length of the said arms 30, said prolongations 14 ending in two small wheels 15 with swivel joints 28. The extensible bar 10 comprises in its middle point a rigidly fixed disc 26, disc to which a case 18 is pivotally connected. Through the said case 18 travels a dentated bar 17, said dentated bar 17 is pressed by a claw made up of two parts 21 and 22, said claw made up of two parts 21 and 22 stands the pressure of a steel spring 27 and is situated inside the case 18. A lever or handle 23 is inserted in the said case 18. Said lever or handle 23 comprises a salient 24, said salient 24 serving to govern the claw made up of two parts 21 and 22.

The case 18 comprising a curve and concave piece 29 adjacent to the point in which the lever or handle 23 is inserted. This curve and concave piece 29 forms a tunnel through which travels the salient 24 of the lever or handle 23. The case 18 has a retractile pin 25 that penetrates into the disc 26, disc 26 being rigidly fixed to the middle point of the extensible bar 10.

I claim:

1. A device to place auto wheels, truck wheels and other vehicles wheels comprising an extensible bar that has two telescopically engaged sections which allow the extension of the said bar, this extensible bar comprising two arms that are connected one to each end of the said bar by means of articulations, said articulations allowing the arms to fold to a position parallel to the extensible bar to facilitate the storage of this device, the said arms comprising two rollers, one on each arm, said rollers being rotatably mounted on the said arms, the function of the said rollers being to support the wheel that is to be placed and to allow it to rotate facilitating its centering on the screws of the brake drums of the auto, truck or other vehicles, the said arms provided with rollers comprising, besides the articulations that connect them to the extensible bar, two other articulations provided with a pawl, said articulations provided with a pawl connecting the said arms to two prolongations that increase the length of said arms, said prolongations ending in two small wheels with swivel joints, one small wheel with swivel joint on each prolongation, the function of the said articulations with a pawl being to allow the said prolongations that end in small wheels with swivel joints to fold to a 90° position in relation to the arms provided with rollers and to form two points of rest or front legs of the auto wheels placer that is being described, the said two points of rest or front legs being fixed to the 90° position by means of the said pawls, the extensible bar comprising in its middle point a rigidly fixed disc to which a case is pivotally connected, a dentated bar which travels through said case and forms the third point of rest or rear leg of the auto wheels placer that is being described, this third point of rest or rear leg being locked at the desired height by means of a claw made up of two parts, said claw made up of two parts being situated inside the said case through which travels the dentated bar, this auto wheels placer being operated by means of a lever or handle comprising a salient that governs the said claw made up of two parts, said claw made up of two parts serving to lock the dentated bar at the desired height, the said case comprising a curve and concave piece adjacent to the point in which the lever or handle is inserted, the said curve and concave piece forming a tunnel through which travels the salient of the lever or handle and impeding the said lever or handle to become detached when the auto wheels placer is being manipulated.

* * * * *